United States Patent [19]
Tani

[11] Patent Number: 5,318,257
[45] Date of Patent: Jun. 7, 1994

[54] MECHANISM FOR SUPPORTING CAMERA IN IMAGE TRANSMISSION APPARATUS

[75] Inventor: Shirou Tani, Kawasaki, Japan

[73] Assignee: Fujitsu Limited, Kanagawa, Japan

[21] Appl. No.: 951,018

[22] Filed: Sep. 25, 1992

[30] Foreign Application Priority Data

Oct. 7, 1991 [JP] Japan ................... 3-259111

[51] Int. Cl.⁵ .................. G03B 17/00; F16M 11/12
[52] U.S. Cl. .................. 248/125; 248/176; 248/918; 354/293
[58] Field of Search ............ 248/371, 372.1, 393, 248/397, 918, 125, 162.1, 178, 184; 354/293, 294

[56] References Cited

U.S. PATENT DOCUMENTS

| | | | |
|---|---|---|---|
| 2,435,816 | 2/1948 | Anderson | 248/125 X |
| 4,249,817 | 2/1981 | Blau | 354/293 |
| 4,410,157 | 10/1983 | Monti et al. | 248/125 |
| 4,938,440 | 7/1990 | Weinfield | 248/178 X |
| 5,033,707 | 7/1991 | Stater et al. | 248/918 X |
| 5,042,763 | 8/1991 | Wong | 248/178 |

FOREIGN PATENT DOCUMENTS 3-9673   1/1991  Japan.
3-60294  3/1991  Japan.
3-201690 9/1991  Japan.

Primary Examiner—Rinaldi Rada
Attorney, Agent, or Firm—Armstrong, Westerman, Hattori, McLeland & Naughton

[57] ABSTRACT

A mechanism for supporting a camera in a TV phone has a pedestal (4) positioned on the lateral side of a display (3), a tubular body (7) standing uprightly on the pedestal (4) while rotatable about an axis thereof, a movable arm (8) having first and second articulations (38, 31) at the upper and bottom ends thereof, respectively, and displaceable in the up-down direction in the interior of the tubular body (7). The arm (8) is completely accommodated in the tubular body (7) at a lowermost position and completely drawn out of the tubular body (7) through an opening formed at the upper end of the tubular body (7) at a uppermost position. A camera holder (9) which holds a camera (6) is mounted on the upper end of the movable arm (8) by the first articulation (38) so that the camera (6) is tiltable forward and rearward.

6 Claims, 9 Drawing Sheets

MECHANISM FOR SUPPORTING CAMERA IN IMAGE TRANSMISSION APPARATUS

BACKGROUND OF THE INVENTION

1. Field of the Invention

The present invention relates to a mechanism for supporting an image-shooting TV camera in an image transmission apparatus, such as a TV phone.

2. Description of the Related Arts

The conventional TV phone illustrated in FIG. 11(a) comprises a phone body 52 with dial keys 51 and a hand set 53 detachably hung therefrom as well as a display 54 standing in front of the phone body. As shown in FIG. 11(b), a TV camera 55 is hinged to a lateral wall of the display 54 so that it can confront an object to be shot, such as a document 56. This camera supporting mechanism is very simple in structure, but has drawbacks in that visual field thereof is rather narrow and document size is limited.

In another conventional TV phone illustrated in FIGS. 12(a) and 12(b), a TV camera 55 is mounted onto the upper end of a polyarticulation arm 57 having three directional freedom of movement and secured to a lower area of a rightside wall of a phone body 52. As this camera supporting mechanism has an increased degree of freedom of movement compared to the former mechanism, a wider scope shot is possible. This mechanism, however, is too complex and expensive. In addition, a document is upside-down in the image shown on the display, seen from the operator. If one wishes to correct this reversed image, the TV camera 55 must be detached from the arm 57 and attached again thereon upside-down. Another problem is that, when the arm swings to the rightside, the document to be shot must be reset.

SUMMARY OF THE INVENTION

Accordingly, a primary object of the present invention is to solve the abovesaid drawbacks of the prior art camera supporting mechanism in an image transmission apparatus.

This object is achieveable by a mechanism for supporting a camera in an image transmission apparatus, such as TV phone, comprising a pedestal positioned on the lateral side of a display, a tubular body standing uprightly on the pedestal while rotatable about an axis thereof, a movable arm having first and second articulations at the upper and lower ends thereof, respectively, and displaceable in the up-down direction in the interior of the tubular body, said arm being completely accommodated in the the tubular body at the lowermost position and completely drawn out of the tubular body through an opening formed at the upper end of the tubular body at the uppermost position, and a camera holder for holding a camera, mounted on the upper end of the movable arm by the first articulation so that the camera is tiltable forward and rearward.

Preferably the camera holder detachably holds a camera body so that the camera is rotatable about a longitudinal axis.

Preferably the movable arm can be freed from the restriction by the inner wall of the tubular body at the uppermost position so that it is tiltable forward and rearward by the second articulation, but is restricted by the inner wall of the tubular body at positions other than the uppermost position so that the movable arm is kept substantially in an upright state.

Preferably hooks are provided in the respective side walls of an arm case mounted at the upper end of the tubular body, and resiliently engageable with slots formed on the bottom wall of the camera holder.

Favorably, the movable arm is always biased upward relative to the tubular body by a spring secured at the lower end thereof so that a weight of the movable arm and a frictional resistance of the same against the inner wall of the tubular body are compensated by the biasing force.

Favorably, the camera holder has a front conical portion fitted to a camera nose, a rear wall standing for supporting the rear end of the camera, and a bottom wall extending horizontally for connecting the former two.

According to the camera supporting mechanism of the present invention, the movable arm is compactly and snugly accommodated in the interior of the tubular body at a rest position.

In an operative position, the camera held thereon is rotatable on the pedestal about the upright axis of the tubular body so that an azimuth angle in the horizontal plane is optionally adjustable. Also the height of the camera is optionally adjustable by properly drawing the movable arm out of the tubular body.

Forward and rearward inclinations of the movable arm by the first articulation enables the adjustment of elevation/depression angles of the camera held on the camera holder relative to a horizontal plane.

When the movable arm is completely drawn out of the tubular body, the elevation/depression angles of the camera are further adjustable to a greater extent by the operation of the second articulation secured at the lower end of the movable arm. According to the above adjustments of height, azimuth and elevation/depression angles, the camera can confront an object to be shot in the optional direction so that the most appropriate image can be obtained.

In addition, as the camera is held on the camera holder while rotatable about the longitudinal axis thereof, it can occupy an upside-down position by a 180° rotation, at which a normal image can be obtained on the display while a document to be shot is placed at a normal reading position of the operator. Also if the operator carries the camera detached from the camera holder in hand, a surrounding scene can be shot accordingly.

BRIEF DESCRIPTION OF THE DRAWINGS

Other objects and advantages of the present invention will be more apparent with reference to the preferred embodiments illustrated in the attached drawings; wherein.

DESCRIPTION OF THE PREFERRED EMBODIMENTS

Figure 1:
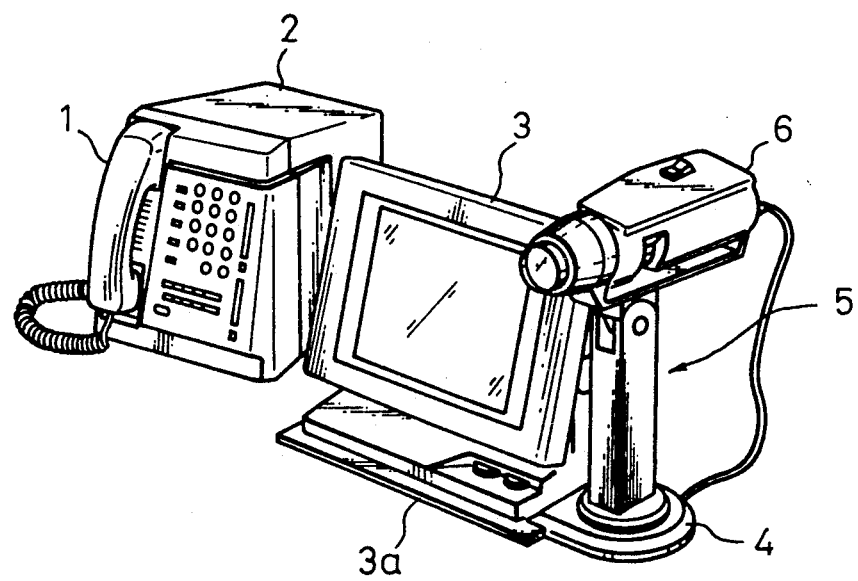
FIG. 1 is a perspective view of a total combination of a TV phone to which the present invention is applied.

As shown in FIG. 1, a TV phone according to the present invention comprises a controller 2 with a hand set 1 hung therefrom, a display 3, and a camera supporting mechanism 5 mounted upright on a pedestal 4 positioned aside a display table 3a, and a camera 6 carried by the mechanism 5.

Figure 2:
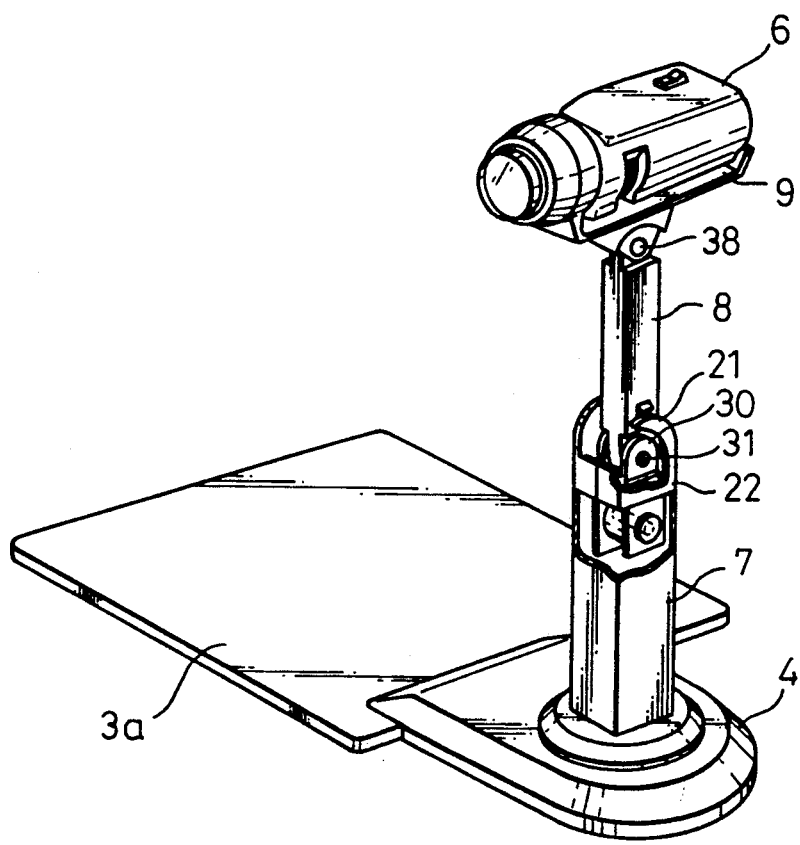
FIG. 2 is a perspective view of a camera supporting mechanism according to the present invention.

As shown in FIG. 2, the camera supporting mechanism 5 has a tubular body 7 mounted at the bottom end thereof on the pedestal 4 while rotatable about an upright axis, a movable arm 8 accommodated in the interior of the tubular body 7 and capable of moving out and in through an opening formed at the upper end thereof, and a camera holder 9 mounted on the upper end of the movable arm 8 via an articulation so that it is tiltable forward and rearward.

Next, structures of the respective elements of the camera supporting mechanism will be described in detail below.

PEDESTAL

Figures 3, 3A:
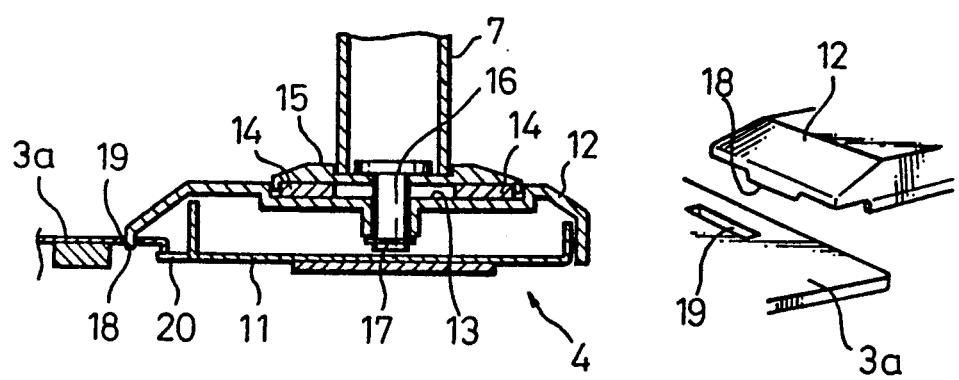
FIG. 3 is a side sectional view of a pedestal.
FIG. 3A is an exploded perspective view illustrating a structure for attaching the pedestal to a display table.

As shown in FIG. 3, the pedestal 4 is formed by inserting an upper casing 12 onto a lower casing 11. A circular recess 13 is formed at a center of the upper casing 12 and a rotation cap 15 is loosely fitted therein via a slide ring 14 made of a high frictional material. The rotation cap 15 is fixed to the lower end of the tubular body 7 by a fastening means such as screws. A stud 16 extends through central apertures of the rotation cap 15 and the upper casing 12 and locked at this position by an E ring 17 that not will slip out. According to this structure, the tubular body 7 is rotatable on the upper casing 12 about the central axis, together with the rotation cap 15.

At the leftside edge of the upper casing 12 is provided a projection 18 that is engaged with a slot 19 formed at a rightside edge of the display table 3a. A leftside extention 20 of the lower casing 11 is pressed onto a desk surface by a weight of the display table 3a so that the position of the pedestal 4 is immobile.

TUBULAR BODY

Figure 4:
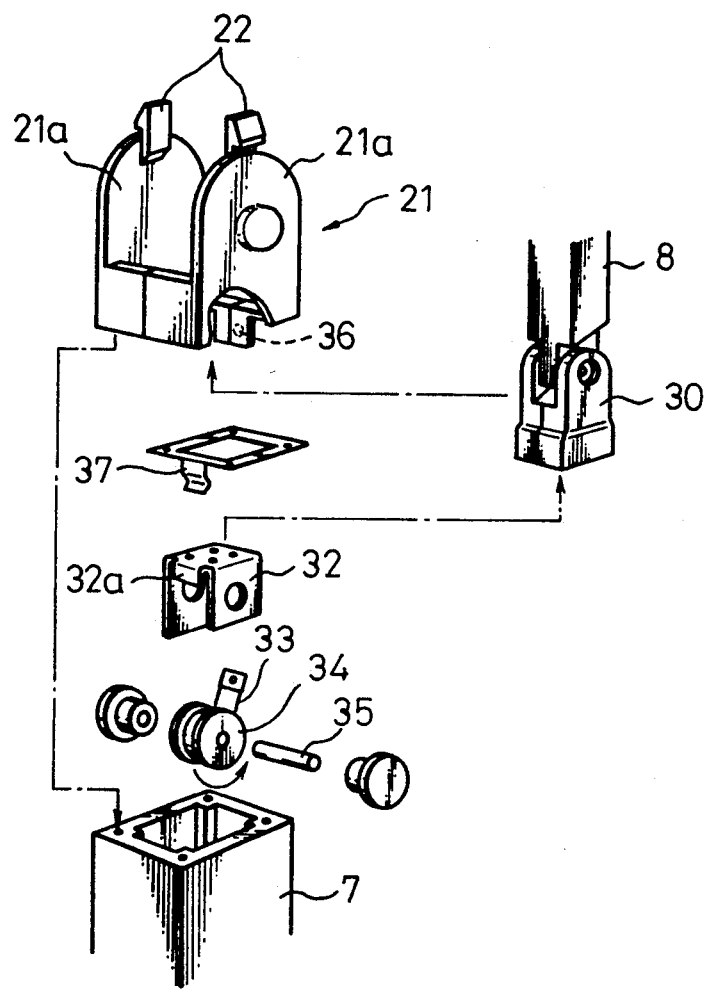
FIG. 4 is an exploded perspective view illustrating a relationship between structures of the upper end portion of a tubular body and of the lower end portion of a movable arm.

As shown in FIG. 4, the tubular body 7 is a hollow member with a square cross-section formed by an extrusion of aluminum and can accommodate the movable arm 8 in the interior thereof, as stated later.

As stated before, the tubular body is fixed at the lower end thereof to the upper casing 12 of the pedestal 4 and has at the upper end thereof an arm case 21 with a pair of arcuate edged side walls 21a. A hook member 22 is formed inside the respective side wall 21a while projecting a hook over the arcuate edged side wall 21a.

MOVABLE MEMBER

The movable arm 8 has a length and a cross-sectional size such that it can be completely accommodated in the interior of the tubular body 7, while loosely inserted therein so that it is slidingly displaceable upwards and downwards within the tubular body.

In FIG. 2, the upper end of the movable arm 8 is secured to the middle portion of a bottom wall of the camera holder 9 by a pin 38, as a first articulation, by which the camera holder 9 is tiltable forward and rearward relative to the movable arm 8.

Figure 5:
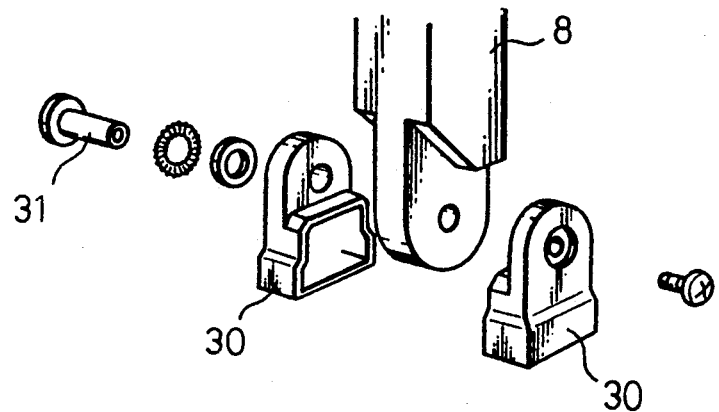
FIG. 5 is an exploded perspective view illustrating a structure of the lower end portion of the movable arm.

In FIG. 5, a slide arm 30 is secured to the lower end of the movable arm 8 by a pin 31, as a second articulation, by which the movable arm 8 is tiltable forward and rearward relative to the slide arm 30. As shown in FIG. 4, a slide member 32 having an inverse U-shaped cross-section is fixed at the lower end of the slide arm 30. A spool 34, on which a coil spring 33 is wound, is rotatably held in the U-shaped inner space of the slide member 32 by a pin 35. The upper end of the coil spring 33 is secured to a tongue 36 formed on the arm case 21 so that the coil spring 33 is unwound when the movable arm 8 is displaced downward in the interior of the tubular body 7 together with the slide member 32 and exerts an upward biasing force on the movable arm 8. In this regard, the biasing force is adjusted so as to be balanced to the frictional force between the tubular body 7 and the movable arm 8.

A plate spring 37 is provided for locking the movable arm 8 at a place when the same is completely drawn out of the tubular body 7, by engagement with the tongue 32a. As illustrated in FIG. 4, plate spring 37 has, in the illustrated embodiment, four holes for fixing it to the tubular body 7 via respective holes therein.

Figure 10:
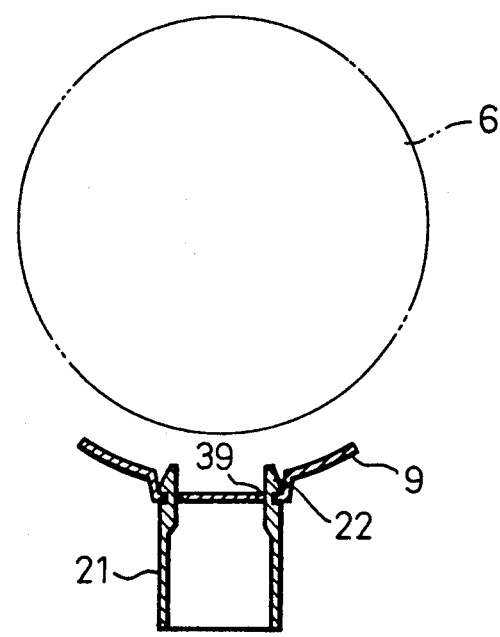
FIG. 10 is a sectional side elevational view of the movable arm in a locked state.
Figure 11A:
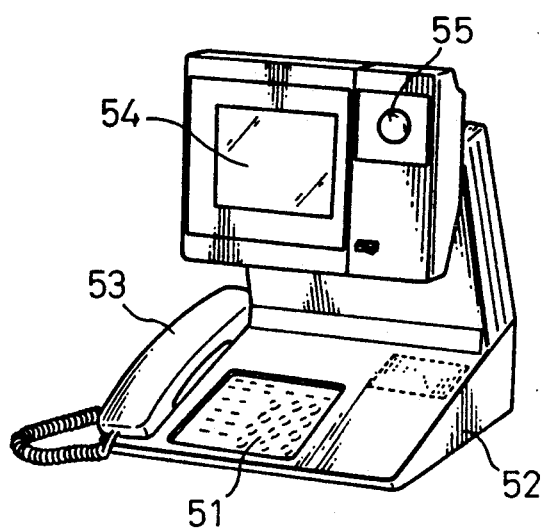
FIGS. 11a-11b is a perspective view of a conventional TV phone.
Figure 11B:
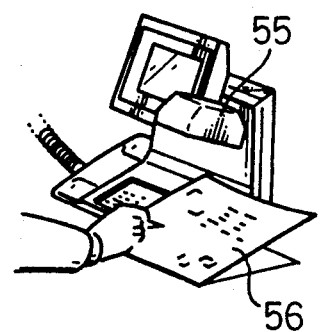
Figure 12A:
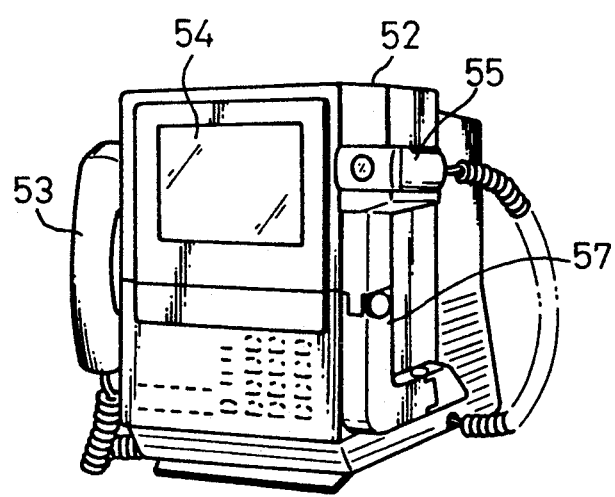
FIGS. 12a-12b is a perspective view of another conventional TV phone.
Figure 12B:
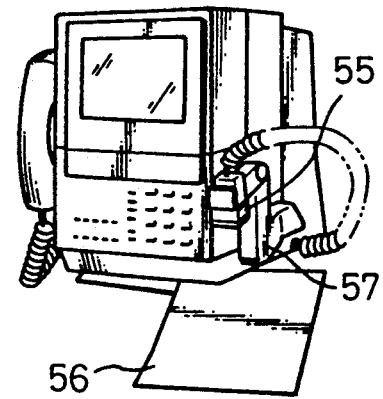

On the other hand, when the movable arm 8 is depressed and completely accommodated in the tubular body 7, the hook members 22 of the arm case 21 fixed to the upper end of the tubular body 7 are resiliently engaged with slots 39 formed correspondingly on the bottom wall of the camera holder 9, whereby the accommodation position of the movable arm 8 is locked against the biasing force of the coil spring 33 (see FIG. 10). If the opposite side walls 21a of the arm case 21 are nipped by a pair of fingers and pressed inward to cause a resilient deformation thereof, engagement between the hook member 22 and the slot 39 is easily released.

When the movable arm 8 has not been completely drawn out of the tubular body 7, the bending motion of the second articulation at the lower end of the movable arm 8 is substantially prevented by the inner wall of the tubular body 7, whereby the movable arm 8 is kept upright relative to the slide arm 30.

CAMERA HOLDER

Figure 6:
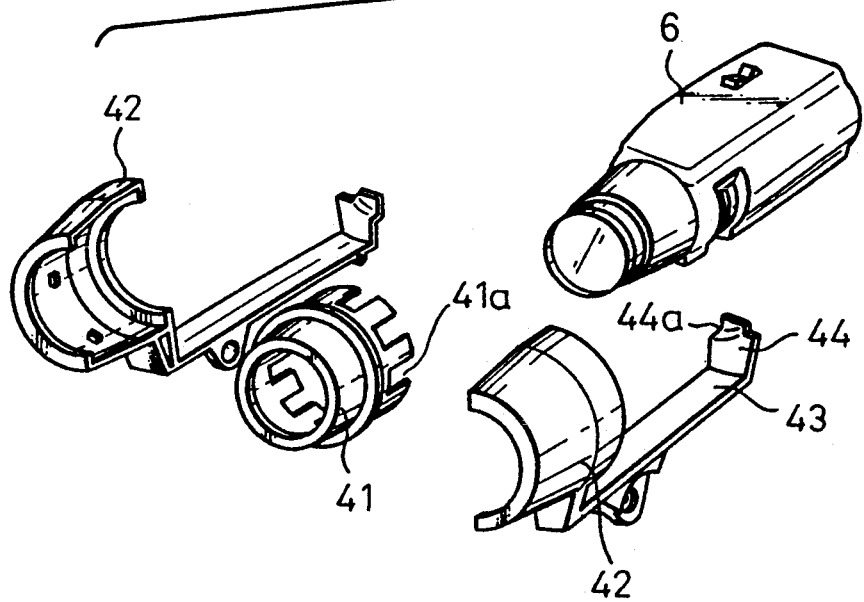
FIG. 6 is an exploded perspective view illustrating a structure of a camera holder; i
Figure 7:
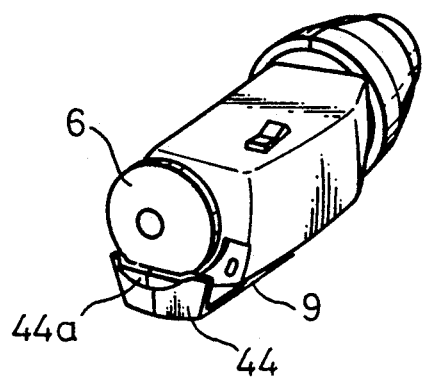
FIG. 7 is perspective view of a rear portion of the camera holder.
Figure 8:
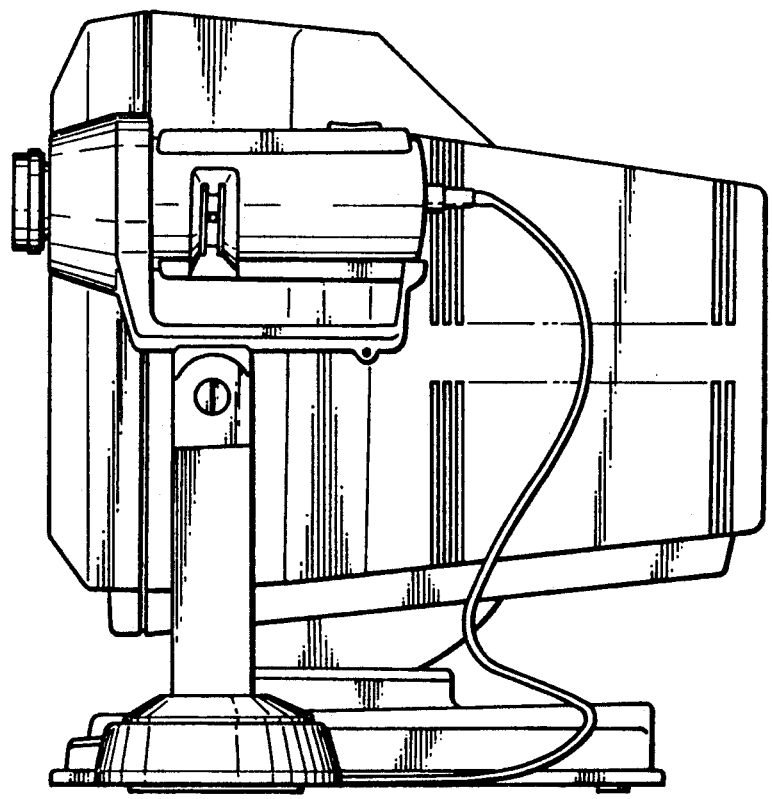
FIG. 8 is a side elevational view of a camera supporting mechanism according to the present invention, when the movable arm has been completely accommodated.
Figure 9:
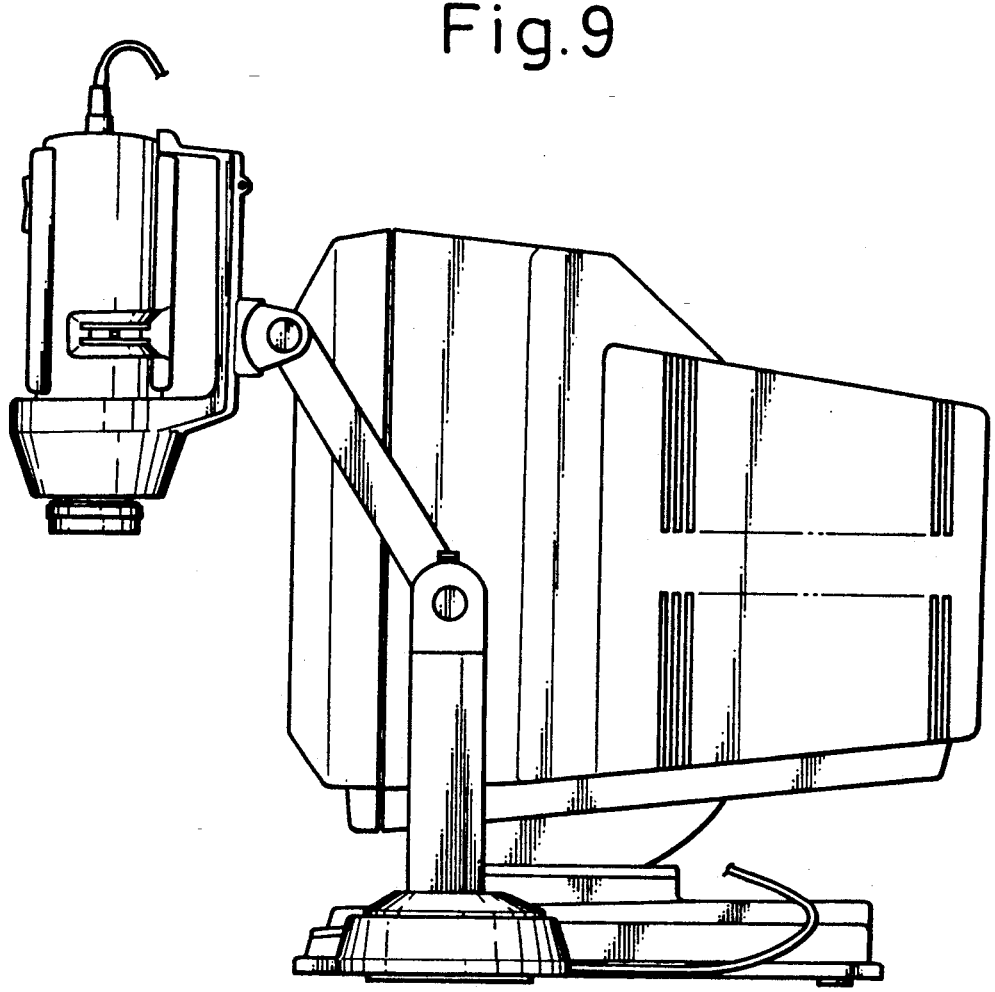
FIG. 9 is a side elevational view of a camera supporting mechanism according to the present invention, when the movable arm has been drawn out and the respective articulations are operated.

As shown in FIG. 6, the camera holder 9 for holding the camera 6 has a front conical portion 41 in which a conical camera nose can be received. The front conical portion 41 has a plurality of cuts 41a so that it is resiliently deformable when the camera 6 is attached or detached. A pair of half bodies 42 are attached to the respective sides of the front conical portion 41 and constitute a bottom wall 43 and a rear wall 44 standing upright therefrom. When attaching the camera to the camera holder, the camera nose is inserted into the front conical portion 41 and the rear end of the camera 6 is depressed toward the bottom wall 43 while resiliently deforming the rear wall 44 and rests on a seat 44a.

The camera 6 thus supported on the camera holder 9 is rotatable about a center axis thereof at an optional angle, even 180°, whereby an image on the display can be reversed upside-down while keeping an object to be shot in a normal reading position. As the camera is easily detached, the operator can use the camera while hand carrying it.

Since the articulations and sliding portions are adapted to have a suitable sliding resistance by a known means, such as a wave washer, the movement thereof is assuredly and smoothly carried out with a proper operating force.

I claim:

1. A mechanism for supporting a camera in an image transmission apparatus, comprising:
    a pedestal positioned on a lateral side of a display,
    a tubular body standing uprightly on the pedestal while rotatable about an axis of the tubular body,
    a movable arm having first and second articulations at upper and bottom ends of the movable arm, respectively, and displaceable in an up-down direction in an interior of the tubular body; said arm being completely accommodated in the tubular body at a lowermost position and completely drawn out of the tubular body through an opening formed at the upper end of the tubular body at an uppermost position, and
    a camera holder for holding a camera, mounted on the upper end of the movable arm by the first articulation so that the camera is tiltable forward and rearward.

2. A mechanism as defined by claim 1, wherein the camera holder detachably holds a camera body in such a manner that the camera is rotatable about a longitudinal axis of the camera.

3. A mechanism as defined by claim 1, wherein when the movable arm is at the uppermost position, the movable arm is free from restriction by an inner wall in the interior of the tubular body so that the movable arm is tiltable forward and rearward by the second articulation, but when the movable arm is at positions other than the uppermost position, the movable arm is restricted by the inner wall of the tubular body so that the movable arm is kept substantially in an upright state.

4. A mechanism as defined by claim 1, wherein hooks are provided in respective side walls of an arm case mounted at the upper end of the tubular body, and said hooks are resiliently engageable with slots formed on the bottom wall of the camera holder.

5. A mechanism as defined by claim 1, further including a spring which is secured at a lower end of the movable arm and which always biases the movable arm upward relative to the tubular body such that a weight of the movable arm and a frictional resistance of the movable arm against an inner wall in the interior of the tubular body are compensated for by a biasing force of the spring.

6. A mechanism as defined by claim 1, wherein the camera holder has a front conical portion fitted to a camera nose, a rear wall standing upright for supporting a rear end of the camera, and a bottom wall extending horizontally for connecting the rear wall and the front conical portion.

* * * * *